United States Patent Office 3,393,889
Patented July 23, 1968

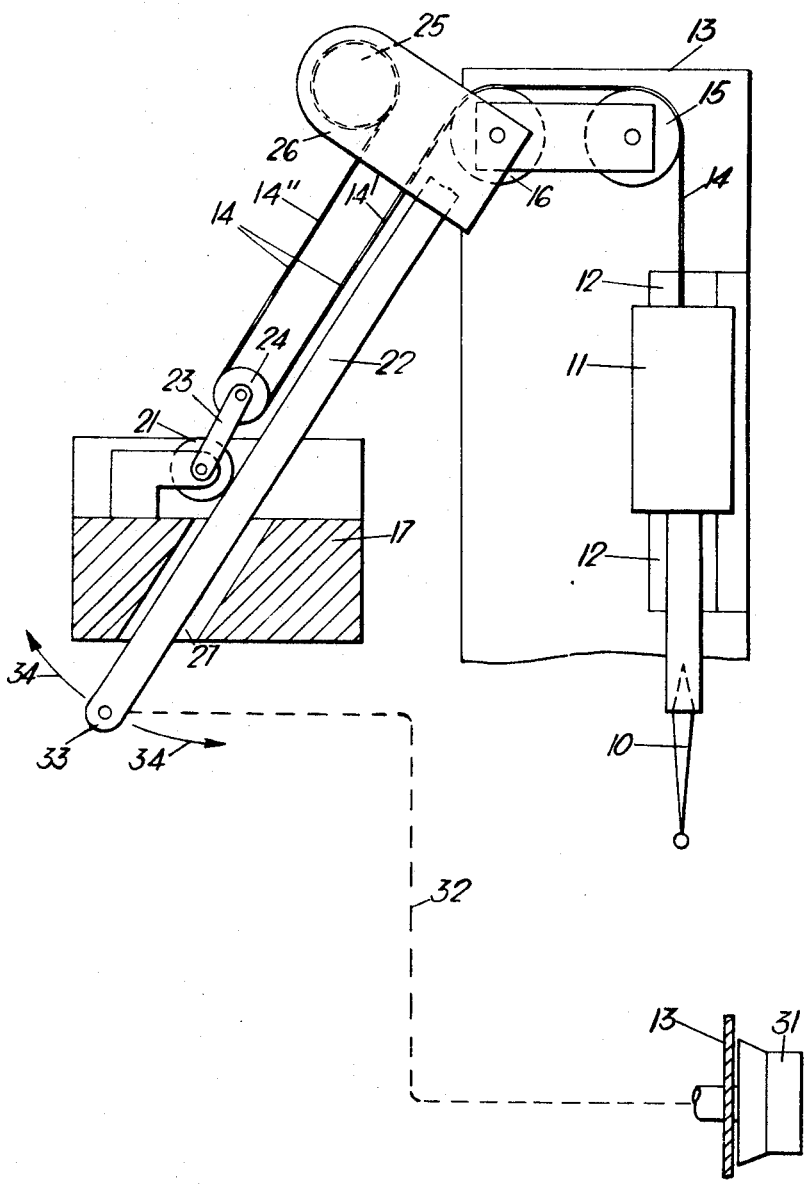

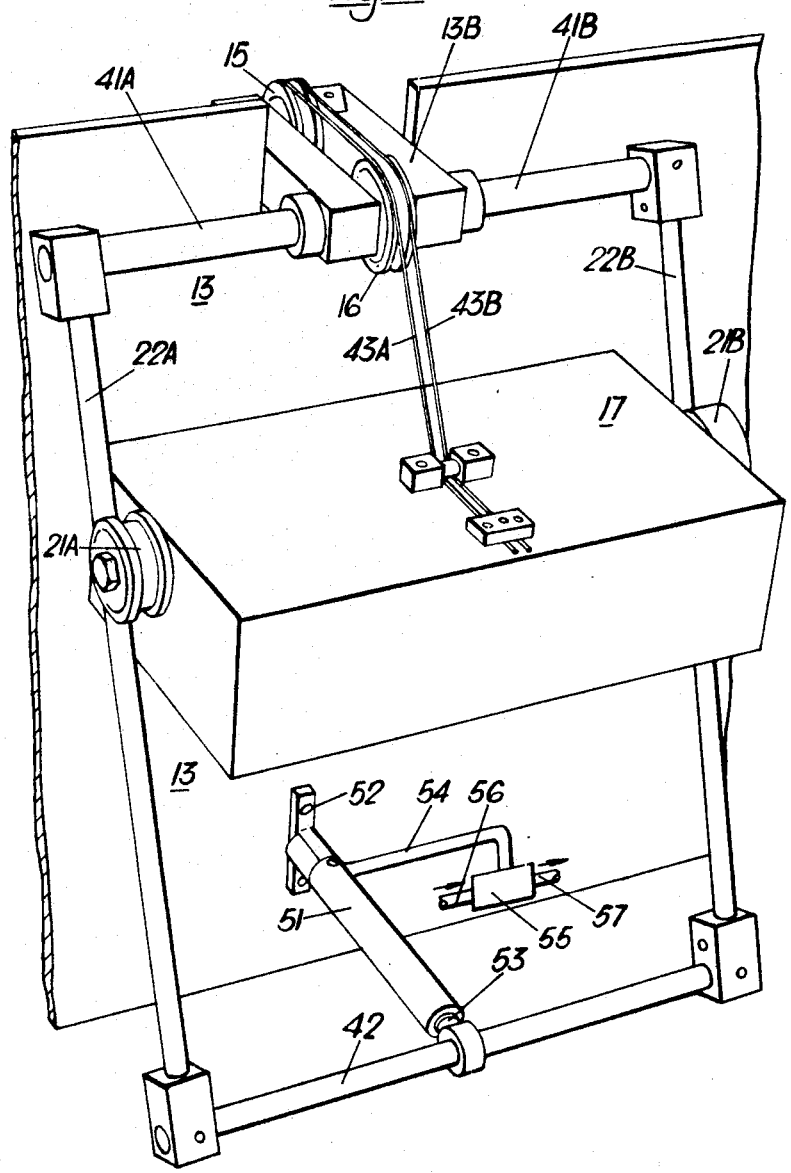

3,393,889
STATIC BALANCING SYSTEMS
Harry Ogden, Edinburgh, Scotland, assignor to Ferranti, Limited, Hollinwood, England, a company of Great Britain and Northern Ireland
Filed Mar. 13, 1967, Ser. No. 622,583
Claims priority, application Great Britain, Mar. 16, 1966, 11,512/66
8 Claims. (Cl. 248—364)

ABSTRACT OF THE DISCLOSURE

A static balancing system (in particular, for a range of freely-hanging measurement probes of different weights) in which the balancing force exerted by a counterpoise mass of fixed weight is varied by adjusting the inclination to the vertical of the slope of a guide surface along which the counterpoise slides.

---

This invention relates to static balancing systems.

An object of the invention is to provide such a system in which a range of objects of different weights may be balanced by a counterpoise of invariable weight.

In accordance with the present invention, a static balancing system for balancing any selected one of a variety of objects of different weights within a predetermined range of weights includes a counterpoise of invariable weight, guide means co-operating with the counterpoise to constrain it to operate along a slope, a flexible inextensible linkage from the selected one of said objects to the counterpoise by way of a pulley system, the free part of the linkage between the pulley system and the counterpoise being parallel to the slope, and means for adjusting the inclination to the vertical of the guide means and hence of the slope thereby allowing the effective component of the weight of the counterpoise to be adjustable over a range corresponding to said predetermined range.

In the accompanying drawings,

FIGURE 1 shows an embodiment of the invention in side elevation, partly in section and somewhat simplified, and FIGURE 2 is a view in perspective of another embodiment.

An embodiment of the invention will be described by way of example with reference to FIG. 1 as applied to inspection apparatus for checking the vertical dimensions of a workpiece. For this purpose the apparatus includes a heavy probe 10, of which various sizes of different weights are available, supported by a carriage 11 which is constrained to move vartically by guideways 12 attached to the frame 13 of the apparatus. The weight of probe and carriage is taken by a flexible inextensible linkage in the form of a tape 14 which passes over a pulley system in the form of rollers 15 and 16 to a counterpoise 17 of invariable weight.

Counterpoise 17 is wholly supported by a roller 21 which is in rolling engagement with guide means in the form of an inclined-plane guide rail 22 which is pivoted at its upper end for angular movement about the axis of roller 16. Roller 21 is coupled by links 23 to another roller 24 which is out of contact with guide 22. Tape 14 passes from roller 16 to roller 24, from which the tape returns to an anchorage provided by a reel 25 of the tape mounted on an extension 26 of guide 22. In the particular construction shown, part 26 is pivoted coaxially with wheel 16, and the actual guide 22 is secured to the part 26.

Reel 25 is normally locked but can be released to allow the active length of the tape—that is, the length between the anchorage and the probe—to be adjusted if necessary, for example to suit workpieces of different height. After such adjustment the reel is again locked.

It is necessary that each of the free parts $14^1$ and $14^{11}$ of the tape between the pulley system and the counterpoise and between the counterpoise and the anchorage should be parallel to the slope defined by the inclination of the guide 22; otherwise the effective weight of the counterpoise would vary with its position along the slope and the probe in use could only be balanced in one position of its vertical travel. To ensure that the free parts $14^1$ and $14^{11}$ of the tape are parallel to the slope at all angular positions of guide 22 within the range, the pivot axis of the guide must coincide with the axis of roller 16, as already described. By "free" part of the tape is meant a part not in contact with a roller.

Guide rail 22 passes through the counterpoise 17 by way of an aperture 27 of extensive enough section to allow the weight to hang freely from roller 21 in all angular positions of the guide. The only constraint exercised by the guide on the counterpoise is thus by way of the reaction exerted by the guide on roller 21.

The inclination of guide 22 with respect to the vertical is controlled by a control knob 31 located in a convenient position on frame 13 from which the position of the probe 10 can be viewed. By means of a linkage indicated by the broken line 32 a manual adjustment of the knob effects a movement of the free end 33 of guide 22 in one or other of the directions indicated by the arrows 34, thereby adjusting the angular position of the guide.

In operation, the effective component of the weight of counterpoise 17, by which is meant the counterbalancing force which it exerts, is dependent on the angle of the slope along which the guide 22 constrains the counterpoise to operate, and hence on the inclination of the guide to the vertical. Whenever, therefore, the probe 10 is changed for one of different weight, the counterbalancing force is modified to suit by manipulation of knob 31, which is adjusted until the probe is seen to be balanced.

The invention thus possess the advantage of allowing a counterpoise of invariable weight to balance any object of weight within a predetermined range, that range being dependent on the range of effective angular positions of guide 22.

The above described pulley-block system by which the counterpoise 17 is supported by the tape gives a movement ratio of 2:1, and so renders the range of movement of the counterpoise along guide 22 half that which would be necessary if the tape were anchored to the counterpoise rather than to reel 25.

The accuracy of balance is dependent on the amount of friction present in the system. The various rollers 15, 16, 21, and 24 should therefore have good quality antifriction bearings and the guideways 12 should be in the form of bearings of the hydrostatic kind.

Antifriction arrangements are especially desirable where the probe mounting includes some device, such as a coil spring, to measure the contact force exerted by the probe on the workpiece. All frictional forces must then clearly reduced to a minimum in order that the desired amount of contact pressure may be consistently applied. The contact force is thus the out-of-balance force and is adjustable by alternating the inclination of the guide 22.

Where the counterpoise 17 is especially bulky or there would be a tendency for it to swing about an axis parallel to the supporting links 23 if the arrangement of FIG. 1 were adopted, the single guide rail 22 may be replaced by two tubular guide rails 22A and 22B located one on each side of the counterpoise as shown in FIG. 2.

The guides are connected at their upper ends by horizontal tubular members 41A and 41B to parts 13A and 13B of the frame 13 so that the plane defined by the guides is again pivotable coaxially with roller 16. Over this roller two cords 43A and 43B pass to the counterpoise. At their lower ends the guides 22A and 22B are joined by a horizontal tubular member 42.

Roller 21 of FIG. 1 is replaced by rollers 21A and 21B engaging guides 22A and 22B respectively. One of these rollers—roller 21A for example—is grooved to prevent lateral movement of the counterpoise with respect to the guides. The other roller 21B is a plain cylindrical drum. Thus the necessary restraint is provided without requiring the guides to be precisely parallel and without risk of the rollers jamming each other against the guides.

To allow the weight of the counterpoise to be halved, the pulley block system of FIG. 1 is dispensed with, and the ends of the supporting cords 43A and 43B are anchored direct to the counterpoise. These cords take the place of the single tape 14 of FIG. 1. They are disposed side-by-side so as to assist the rollers 21A and 21B in preventing the counterpoise from tending to swing about on axis normal to the inclined plane. The free parts of the cords between pulley 16 and their anchorage on the counterpoise are parallel to the plane defined by the guides for the reason already stated—namely, to ensure that the effective weight of the counterpoise is unaffected by its position on the slope.

The absence of a groove from roller 21B has the further advantage of allowing the counterpoise to tilt about that axis until the tensions in the suspension cords are equal.

To accommodate the two cords, pulleys 15 and 16 are each provided with two grooves. The use of two cords rather than a single cord or tape allows the weight of the counterpoise to be better distributed and makes the linkage more flexible.

To adjust the inclination of the guide plane, a simple hydraulic actuator may conveniently be used. It consists of a cylinder 51 pivotally connected by a bracket 52 to part of the frame 13 and a piston (not visible) coupled by a piston rod 53 to the cross member 42 of the guide frame. The cylinder is connected by a flexible coupling 54 to a hydraulic valve 55 arranged to control the extension and retraction of the piston by connecting the cylinder to supply or drain channel 56 or 57 in known manner, thereby adjusting the inclination to the vertical of the plane defined by the guides.

The use of the invention is not limited to that of the particular examples just described, but may extend to any apparatus where it is convenient to use only one counterpoise to support a variety of objects having different weights within a predetermined range.

What I claim is:

1. A static balancing system for balancing any selected one of a variety of objects of different weights within a predetermined range of weights including a counterpoise of invariable weight, guide means co-operating with the counterpoise to constrain it to operate along a slope, a flexible inextensible linkage connected to and extending from the selected one of said objects to the counterpoise, a pulley system between the object and the counterpoise carrying said linkage, the free part of the linkage between the pulley system and the counterpoise being parallel to the slope, and means for adjusting the inclination to the vertical of the guide means and hence of the slope, thereby allowing the effective component of the weight of the counterpoise to be adjustable over a range corresponding to said predetermined range.

2. A system as claimed in claim 1 wherein the guide means includes a guide which passes freely through an aperture in the counterpoise, and a roller carried by the counterpoise and engaging the guide.

3. A system as claimed in claim 1 wherein the guide means includes two guides located one on each side of the counterpoise, and a pair of rollers carried by the counterpoise, each of which rollers engages one of the guides.

4. A system as claimed in claim 3 wherein one of the rollers is grooved to prevent lateral movement of the counterpoise with respect to the guide means and the other roller is plain, cylindrical.

5. A system as claimed in claim 1 wherein the pulley system includes a pulley block supporting the counterpoise giving a two-to-one ratio between the movement of the object and of the counterpoise, the end of the linkage adjacent the counterpoise being anchored to a part of the guide means, and the free part of the linkage between the counterpoise and the anchorage being parallel to said slope.

6. A system as claimed in claim 5 including means for adjusting the active length of the linkage.

7. A system as claimed in claim 1 wherein the linkage is anchored directly to the counterpoise.

8. A system as claimed in claim 1 wherein the means for adjusting the inclination of the guide means includes a hydraulic actuator coupled to the guide means.

References Cited

UNITED STATES PATENTS

| | | | |
|---|---|---|---|
| 312,194 | 2/1885 | Evarts | 283—364 |
| 512,087 | 1/1894 | Ashley | 248—364 XR |
| 684,166 | 10/1901 | Baker | 248—364 XR |
| 1,982,954 | 12/1934 | Grobe | 248—292 XR |

JOHN PETO, *Primary Examiner.*